Jan. 31, 1967 L. DIETCH 3,301,945

AUTOMATIC COLOR TEMPERATURE CONTROL

Filed July 1, 1964

Inventor
LEONARD DIETCH
By Nicholas A. Camasto
Atty.

United States Patent Office 3,301,945
Patented Jan. 31, 1967

3,301,945

AUTOMATIC COLOR TEMPERATURE CONTROL

Leonard Dietch, Skokie, Ill., assignor to Admiral Corporation, Chicago, Ill., a corporation of Delaware
Filed July 1, 1964, Ser. No. 379,485
10 Claims. (Cl. 178—5.4)

Figure 1:
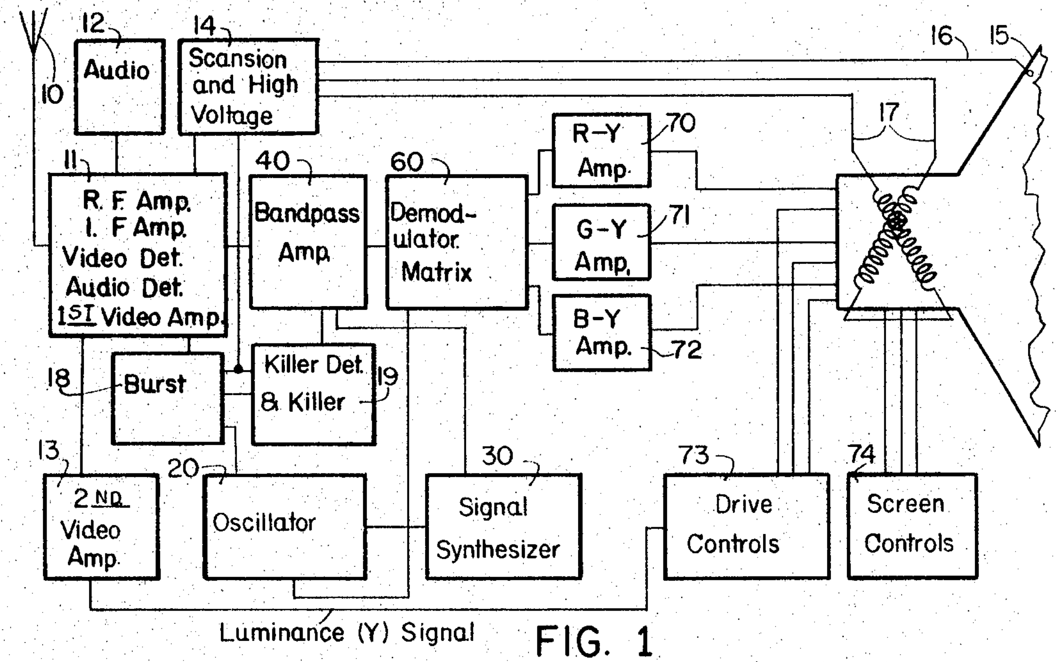

This invention relates to color television receivers and specifically to color television receivers including means for optimizing both monochrome and color presentations. More specifically, the invention comprises means for automatically changing the color temperature of the picture tube raster during reception of a color signal to thereby augment the color presentation.

Tri-gun shadow mask type picture tubes are extensively used in the color television art today. These tubes have mosaic targets of screens consisting of a plurality of groups of three dots of the primary color phosphors, red, blue and green, which groups or clusters are commonly called triads. Accurately displaced from the target is a shadow mask consisting of a metal screen having apertures positioned adjacent to and in registration with corresponding triads. The three electron guns in the neck of the picture tube are mechanically prealigned and electrically and magnetically focused and controlled such that the electron stream from each gun only impinges upon a single phosphor in each triad. Thus, it is common (and proper) to speak of a red gun, a blue gun and a green gun.

During monochrome reception the primary color phosphors are energized in a predetermined ratio to produce white light of a certain color temperature. The color temperature is derived from Planck's spectral analysis of hot bodies, where "different colors" are associated with different temperatures. The television receiver has numerous controls and adjustments for setting up the white condition since there are many variables involved, such as manufacturing tolerances in the electron guns, efficiency of the color phosphors, the proportion of electrons striking the shadow mask, etc. Generally, two sets of controls are in use today, these being screen controls, which determine the cutoff characteristics of the electron guns, and drive controls which affect the translation efficiency of the guns.

It is common knowledge that the average television viewer prefers a monochrome picture that is produced by phosphors having a slightly bluish content. This is due to the fact that a little blue tends to make for apparently "whiter whites." Picture tube manufacturers recognize this fact and construct their monochrome picture tubes with appropriate phosphors to yield this result. On the other hand, with present FCC signal standards the best color pictures are produced on a background which is somewhat yellow or sepia in tone. With a bluish screen satisfactory color production is extremely difficult to achieve. Flesh tones, especially (the only standard by which the average viewer can really adjust his color set) are extremely difficult to obtain with a bluish raster. With a slightly sepia screen, however, an overall warmth is given to the color picture and flesh tones are readily obtainable. It should be noted that alternatively calling the raster color yellow and sepia is not inconsistent since the high-light areas appear yellow and low-light areas appear sepia.

At present, the average color receiver is probably used more for monochrome reception than for color reception. However, this situation is changing rapidly as color programming displaces monochrome programming to a greater degree. In spite of this rapid change, it is anticipated that color receivers will still be utilized for monochrome viewing to a great extent. Thus, both screen conditions are, and will continue to be, desirable depending upon the program material.

The present invention is related to a pair of co-pending applications—Serial No. 342,726, filed February 25, 1964 and Serial No. 368,927, filed May 20, 1964—which incorporate inventions meeting both of these conditions. In the first co-pending application referred to, a manual control is incorporated whereby the viewer may actually change the raster color in accordance with his own preference. In the second co-pending application the raster color is changed automatically by varying the picture tube bias during color signal reception. In the present invention, the change in raster color is also accomplished automatically in response to reception of a control signal. However, this is done by synthesizing a color signal of desired characteristics and adding it to the regular color signal. In one embodiment of the invention the viewer may also predetermine the degree of change in the color temperature of the raster although the change still occurs automatically. Thus, in accordance with the preferred embodiment of the invention, an automatic color-temperature control circuit is provided for shifting the color temperature of the light output from the receiver screen along an axis linking blue and yellow. For monochrome reception the screen color may be set towards blue and during color reception the screen color will automatically be reset towards yellow.

Accordingly, the principal object of this invention is to provide a novel color television receiver.

Another object of this invention is to provide a compatible monochrome-color television receiver, including means for automatically adjusting the raster color of the screen in accordance with the type of television signal received.

An additional object of the invention is to provide means in a color television receiver for automatically shifting the raster color from blue to sepia responsive to receipt of a color signal.

A still further object of this invention is to provide an automatic color-temperature control for changing the raster color of the television screen in response to a color burst signal which includes means synthesizing and adding a color signal of predetermined color characteristics to the received color signal.

Still another object of this invention is to provide means for automatically changing the color temperature of the raster of a television screen responsive to reception of a color television signal by taking a portion of the output of the color carrier generator and adding it in desired phase and amplitude to the received color signal prior to demodulation thereof.

Figure 2:
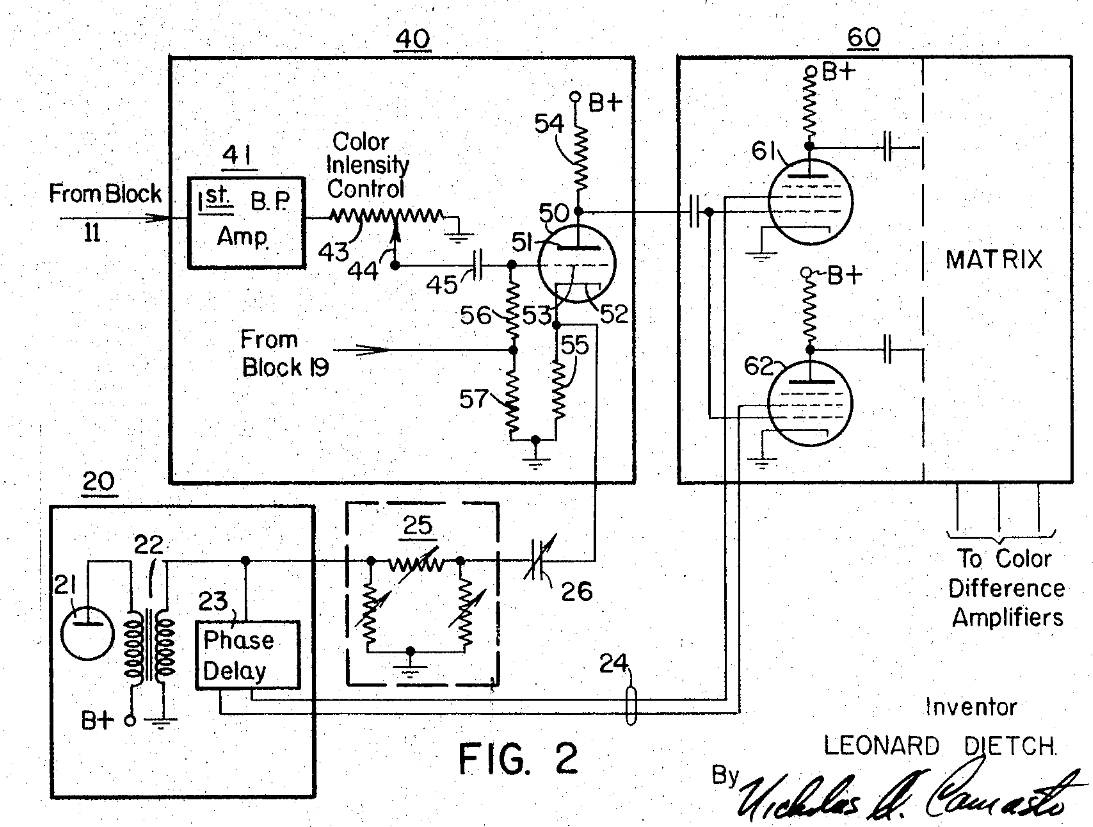

Further objects and advantages of this invention will be apparent upon reading the detailed specification in conjunction with the drawings in which:

FIGURE 1 is a block diagram of a color television receiver employing the invention; and FIGURE 2 is a schematic diagram of the inventive portion of FIGURE 1.

In accordance with the preferred embodiment of the invention, a portion of the output of the color carrier (reference) oscillator is coupled through a phase shifting network to the input of the last bandpass amplifier stage (prior to the demodulators). The signal thus coupled to the bandpass amplifier appears to be an additional color signal and is accordingly demodulated along with the regular color signal. Thus, a constant color signal of desired characteristics is applied to the color television picture tube for effectively changing its color temperature.

Referring now to FIGURE 1, an antenna 10 is coupled to a block 11 which is indicated as including an RF amplifier, an IF amplifier, video and audio detectors and a first video amplifier. The circuitry included in block 11 is conventional in the television art and is common to both monochrome and color television receivers. Block 12, labelled AUDIO, is coupled to block 11 and includes circuitry for reproducing the audio accompaniment of the television signal received by antenna 10. Block 13, labelled 2nd VIDEO AMP, contains further circuitry for amplifying the monochrome information, that is, the brightness or luminance information (Y signal) of the picture portion of the television signal. Block 14, labelled SCANSION and HIGH VOLTAGE, includes circuitry for developing the necessary horizontal and vertical sweep voltages for scanning the electron beams across the face of picture tube 15 and the high operating potential required by picture tube 15.

The scansion voltages are coupled to a set of deflection windings 17, which generate the electromagnetic forces for deflecting the electron beams. The high voltage from block 14 is coupled over a lead 16 to appropriate electrodes (not shown) in picture tube 15. Block 11 is also coupled to block 40, labelled BANDPASS AMPLIFIER, and to block 18, labelled BURST. Block 18 is further connected to block 14 above and to block 19, labelled KILLER DETECTOR and KILLER. Block 18 is also coupled to block 20, labelled OSCILLATOR, and block 19 is coupled to block 40. The output of block 20 is also coupled to block 40 by way of block 30, labelled SIGNAL SYNTHESIZER. Blocks 20 and 40 are further coupled to block 60, labelled DEMODULATOR MATRIX, the output of which is coupled to blocks 70, 71 and 72, labelled R–Y AMP, G–Y AMP and B–Y AMP, respectively. Block 13 is coupled to block 73, labelled DRIVE CONTROLS, from which emanate three leads going to picture tube 15. A further block 74, labelled SCREEN CONTROLS, is shown coupled to picture tube 15. These controls were functionally described above.

During monochrome signal reception the output of block 11 contains line and field synchronizing components, brightness (video) information components and audio components. During color signal reception the output of block 11 contains the above as well as a color reference signal, commonly called a color burst signal, and sideband components of two, phase modulated, suppressed carrier, color information signals. Block 18 is initiated responsive to the color burst signal which appears on the "back porch" of the horizontal blanking pedestals in accordance with NTSC signal standards. The bandpass amplifier translates the sideband components and is turned on by the color killer detector and killer circuits. The killer detector is responsive to the burst and controls the color killer which cuts off the bandpass amplifier during monochrome reception to preclude noise in the idle color channel from appearing on the television screen. Both block 18 and block 19 are fed keying voltages from block 14. These keying voltages are pulses which coincide with the horizontal sync pulses and render the circuits of these blocks effective only during horizontal sync pulse time.

The oscillator in block 20 may be of the free running type which has a natural frequency equal to that of the color burst signal. This oscillator produces a continuous wave signal which is locked in frequency and phase by the color burst signal. The output of the oscillator is fed to the demodulator and matrix of block 60 where it is combined in proper phase relationship with the output of the bandpass amplifier to accomplish demodulation of the phase modulated color information signals. After proper matrixing, these signals appears as R–Y, G–Y and B–Y signals, which are fed to appropriate amplifiers and appropriate electrodes in the picture tube, where the Y signal is combined therewith to produce R, B and G signals.

In FIGURE 1 it is seen that block 20 (oscillator) is also coupled to block 30 (signal synthesizer) which, in turn, is coupled to block 40 (bandpass). A portion of the oscillator output is coupled to the signal synthesizer which, in turn, feeds the bandpass amplifier. Details of the operation of this portion of the circuit will be described with reference to FIGURE 2.

In FIGURE 2, positions of the contents of blocks 20,

40 and 60 are shown. A first bandpass amplifier 41 is shown in block 40 with its connecting lead from block 11 (1st video). The output of the first bandpass amplifier feeds a color intensity control 42 which comprises a resistance element 43, connected to amplifier 41 at one terminal and ground at the other terminal, and a movable wiper element 44 in contact with the resistance element. The arrangement is that of a conventional potentiometer and movement of wiper 44 varies the amount of signal coupled from the first bandpass amplifier to the second bandpass amplifier.

The second bandpass amplifier is shown as a triode 50 including an anode 51, a cathode 52 and a control grid 53. Anode 51 is coupled through a load resistor 54 to a source of B+ and cathode 52 is connected through a cathode resistor 55 to ground. A voltage divider arrangement is connected between grid 53 and ground and consists of a pair of resistors 56 and 57. The junction of these resistors is connected to block 19 (the killer circuit). It is at this junction that an appropriate voltage is impressed to disable the bandpass amplifier during monochrome signal reception. Movable wiper 44 is coupled through a coupling capacitor 45 to control grid 53, thus providing an amplitude control for the sideband information coupled to tube 50.

The arrangement as thus far described is fairly conventional for a two-stage bandpass amplifier. The sideband information of the phase modulated, suppressed carrier color signals is amplified by the first bandpass amplifier 41 and coupled, via the color intensity control 42, to the control grid of the second bandpass amplifier for further amplification. In practice, there may be other refinements to this circuit, such as provision for automatic color control which would automatically maintain the incoming color signals at a fixed level over a substantial range of received signal strengths. However, these refinements are not necessary to an undertanding of the invention and are, accordingly, omitted for the sake of simplicity.

In block 60 the demodulator is represented by a pair of demodulator tubes 61 and 62. In the instant case the tubes are pentodes although quite obviously triodes or other tube types may be utilized. As shown, the output of the second bandpass amplifier is coupled to both demodulator tube control grids. The output of the demodulator tubes feeds the matrix, which in turn feeds the color difference amplifiers R–Y, B–Y and G–Y.

Block 20 includes a partial representation of an oscillator tube 21 having an anode fed from a source of B+ through a transformer 22. The secondary of the transformer is coupled to a phase delay network 23 and to a level determining network 25 enclosed in a dashed line box. A pair of leads 24 emanate from the phase delay network 23 and are respectively connected to the screen electrodes of demodulator tubes 61 and 62.

The output of oscillator tube 21 is locked in frequency and phase with the color burst signal by means which are not shown. There are numerous systems extant for providing this control function and any of these systems may be used with equal facility in this circuit, the method of controlling the oscillator forming no part of this invention. By virtue of the phase delay network 23 a pair of reference signals are obtained on leads 24 and applied to the demodulator tubes. With the sideband information of the color signals applied to the control grids and the reference signals applied to the screen grids, demodulator tubes 61 and 62 synchronously demodulate the sideband information in a well known manner to produce a pair of coded color signals which are matrixed to produce the three color difference signals.

The other output of the oscillator feeds level determining network 25. This network is optional as regards the basic concept of the invention but, if used, should ideally provide for controlling the amplitude of the signal taken from the oscillator without introducing any phase shift thereto. For reasons which will become clear, the network should exhibit a constant impedance over its full control range. The output of this network is coupled to a variable capacitance 26 which, in turn, is connected to cathode 52 of the second bandpass amplifier tube 50. Variable capacitance 26 introduces a predetermined phase shift to the oscillator signal and, depending upon the degree of this phase shift, impresses a signal representative of a constant color on the bandpass amplifier. It will be obvious that the synthesized signal may be arbitrarily selected both with respect to its color and its magnitude. Since the synthesized signal is designed to augment the color display, best results will be obtained by adding a signal representative of yellow (minus blue) having an amplitude great enough to eliminate the bluish cast purposely introduced to the raster on black-white setup.

The circuit shown provides the greatest amount of flexibility in the invention since both the amplitude and the phase of the synthesized signal are controllable. Hence, not only may the hue of the raster be determined, but also the saturation. In actual practice network 25 may be eliminated and capacitor 26 may have a fixed value. In such a situation the change in raster color, which will occur upon a color signal being received, will be fixed.

To recapitulate, a portion of the oscillator output is shifted in phase a predetermined amount and is introduced into the second bandpass amplifier where it is combined with the original sideband components of the two phase modulated, suppressed carrier color signals. The output of the second bandpass amplifier is coupled to the demodulator. As regards the synthesized signal which is used to augment the color display, the demodulator is incapable of distinguishing it from any other color signals. Consequently, with respect to the demodulator, the color signals appear to be ones which would have been generated from color cameras viewing a color scene with an overall tint represented by the augmenting color signal. In accordance with the teachings of the invention, this tint will preferably be sepia in tone. Consequently, the output of the demodulators (and the matrix) will consist of signals containing a constant, which will effectively tint the raster of the television picture tube.

It should be noted, that by virtue of the point in the circuit at which the synthesized signal is introduced, the raster color will be unaffected by the color intensity control setting. This, then, gives rise to an additional advantage of the invention in that a form of color indicator is also obtained. When the raster appears sepia a color burst is being received and, consequently, a color program is in progress.

The point of connection of the augmenting signal also insures that there is no change in raster color for monochrome viewing. As stated previously, during monochrome reception there is no color burst and, consequently, the color killer in block 19 applies a negative potential to the control grid of the second bandpass amplifier which effectively disables it. While the color carrier oscillator may still be operative, the synthesized signal is impressed upon a "dead" stage and is rendered ineffective.

What has been described is a novel automatic color temperature control circuit for a color television receiver which automatically changes the raster color of a color television screen responsive to reception of a color television signal. It is understood that those skilled in the art may readily perceive numerous modifications and alterations in the disclosed structure embodying the invention without departing from the true spirit and scope thereof.

The embodiments of the invention in which an exclusive property or privilege is claimed are defined as follows:

1. In a color television receiver having color signal translation channel means for translating color signal information, including phase modulated components of a suppressed carrier and a reference phase component; chromatic display means coupled to the output of said color signal translation means; means generating a continuous wave signal under control of said reference phase component for demodulation of said phase modulated components; and means synthesizing and adding another color signal of desired characteristics to said modulated components for augmenting the color display of said chromatic display means.

2. In a color television receiver including monochrome and chroma signal translation channel means for receiving and translating both monochrome and color signal information, said color signal information including phase modulated components of a suppressed carrier and a reference phase component; means enabling said chroma signal translation channel means responsive to said reference phase component; means generating a continuous wave signal under control of said reference phase component for demodulation of said phase modulated components; and means synthesizing and adding another color signal of desired characteristics to said modulated components for augmenting the chromatic display.

3. In a color television receiver including a monochrome translation channel, a color translation channel, and means receiving both monochrome and color television signals, said color television signal including suppressed carrier phase modulated color signal components and a color burst signal for regenerating said suppressed carrier; an oscillator circuit developing a regenerated carrier under control of said color burst; demodulator means, in said color translation channel, coupled to said oscillator circuit for synchronously detecting said phase modulated color signal components; color killer means disabling said color translation channel in the absence of said color burst; and means augmenting the color display of said receiver comprising signal synthesizing means, said signal synthesizing means including means coupled to said oscillator for mixing a portion of the output thereof with said phase modulated color signal components.

4. In a color television receiver as set forth in claim 3 wherein said signal synthesizing means further includes a level attenuator and a phase shifter for controlling the amplitude and phase of the synthesized signal.

5. In a color television receiver; a video detector developing monochrome signal information during reception of monochrome television signals and color signal information as well as monochrome signal information during reception of a color television signal, said color signal information including suppressed carrier phase modulated components and a color burst reference component; burst translation means responsive to said color burst reference component; bandpass amplifier means responsive to said phase modulated components; means, under control of said burst translation means, disabling said bandpass amplifier means during absence of said color burst reference component; carrier regeneration means generating a carrier identical to said suppressed carrier, under control of said burst translation means; synchronous demodulator means coupled to both said bandpass amplifier means and said carrier regeneration means for demodulating said phase modulated information; and synthesizing means developing an augmenting color signal for addition to said phase modulated components, said synthesizing means comprising a phase determining network coupled between said carrier regeneration means and said bandpass amplifier means.

6. In a color television receiver as set forth in claim 5 wherein said phase determining network comprises a capacitor.

7. In a color television receiver including a color producing picture tube; a video detector developing monochrome video information and color signal information responsive to a received color television signal, said color signal information including suppressed carrier phase modulated components and a color burst reference component; a burst amplifier separating and amplifying said color burst reference component; a bandpass amplifier selecting and amplifying said phase modulated information; a color killer, under control of said burst amplifier, disabling said bandpass amplifier during absence of said color burst reference component; oscillator means generating a carrier having the same frequency and selected phases of said color burst reference component; a synchronous demodulator coupled to the outputs of both said bandpass amplifier and said oscillator means for demodulating said phase modulated components; and a phase determining network coupled between said oscillator means and the input of said bandpass amplifier for applying a constant artificial signal representative of a desired color to said phase modulated components, whereby the color temperature of the light output from said color producing picture tube is changed during reception of a color television signal.

8. In a color television receiver as set forth in claim 7 further including a color intensity control coupled to the input of said bandpass amplifier for controlling the level of said phase modulated components whereby the level of the applied constant artificial signal representative of a desired color is unaffected by the setting of said color intensity control.

9. In a color television receiver including a color picture tube; a video detector developing a composite signal including line and field synchronizing components and brightness information components during reception of a monochrome television signal and color signal components as well as the above said components during reception of a color television signal, said color signal components including a suppressed carrier phase modulated signal and a color burst signal; burst means separating said color burst signal from said composite signal; bandpass amplifier means separating and amplifying said suppressed carrier phase modulated signal; color killer means disabling said bandpass amplifier means under control of said burst means when said color burst is not present; oscillator means generating, under control of said burst means, continuous signals identical in frequency to said suppressed carrier; synchronous demodulator means coupled to both said band-pass amplifier and said oscillator means demodulating said phase modulated information; and a phase shifting impedance, coupled between the output of said oscillator means and the input of said bandpass amplifier means, whereby a predetermined augmenting color signal is added to said phase modulated components to add an over-all tint to the light output from said color tube only during reception of a color television signal.

10. In a color television receiver including a color picture tube; a video detector developing a composite signal including line and field synchronizing components and brightness information components during reception of a monochrome television signal and color signal components as well as the above said components during reception of a color television signal, said color signal components including a suppressed carrier phase modulated signal and a color burst signal; burst means separating said color burst signal from said composite signal; bandpass amplifier means including first and second bandpass stages separating and amplifying said suppressed carrier phase modulated signal; a color intensity control coupled between said first and second bandpass stages for controlling the level of said phase modulated components; color killer means disabling said second bandpass amplifier stage under control of said burst means when said color burst is not present; oscillator means generating, under control of said burst means, continuous signals identical in frequency to said suppressed carrier; synchronous demodulator means coupled to both said second bandpass amplifier stage and said oscillator means demodulating said phase modulated information; and a phase shifting capacitance, coupled between the output of said oscillator means and the input of said second bandpass amplifier stage means, whereby a predetermined augmenting color signal is added to said phase modulated components to add an overall tint to the light output from said color tube only during reception of a color television signal, said overall tint being independent of the setting of said color intensity control.

References Cited by the Examiner

UNITED STATES PATENTS

| | | | |
|---|---|---|---|
| 2,954,426 | 9/1960 | Kroger | 178—5.4 |
| 2,955,152 | 10/1960 | Keizer | 178—5.4 |
| 3,135,824 | 6/1964 | Boothroyd | 178—5.4 |

DAVID G. REDINBAUGH, *Primary Examiner.*

J. A. O'BRIEN, *Assistant Examiner.*